(12) United States Patent
Glazik

(10) Patent No.: US 6,625,969 B2
(45) Date of Patent: Sep. 30, 2003

(54) TIP FOR COVERING THE SNOOT OF A CROP DIVIDER

(75) Inventor: Gary B. Glazik, Paxton, IL (US)

(73) Assignee: Plastic Designs, Inc., Paxton, IL (US)

( * ) Notice: Subject to any disclaimer, the term of this patent is extended or adjusted under 35 U.S.C. 154(b) by 0 days.

(21) Appl. No.: 09/941,034

(22) Filed: Aug. 27, 2001

(65) Prior Publication Data

US 2003/0037528 A1 Feb. 27, 2003

(51) Int. Cl.⁷ .............................................. A01D 45/02
(52) U.S. Cl. .......................................... 56/119; 56/314
(58) Field of Search ...................... 56/119, 103, 105, 56/106, 64, 66, 88, 82, 93, 94, 314

(56) References Cited

U.S. PATENT DOCUMENTS

| | | | | |
|---|---|---|---|---|
| 1,878,941 A | * | 9/1932 | Lindgren | 56/119 |
| 3,387,440 A | * | 6/1968 | Karlsson | 56/119 |
| 4,493,181 A | * | 1/1985 | Glendenning et al. | 56/119 |
| 4,550,555 A | * | 11/1985 | Rohlik | 56/314 |
| 4,700,537 A | * | 10/1987 | Emmert | 56/119 |
| 5,195,309 A | * | 3/1993 | Mossman | 56/105 |
| 5,787,697 A | * | 8/1998 | Post | 56/119 |
| 5,865,019 A | * | 2/1999 | Hurlburt et al. | 56/118 |
| 5,910,092 A | * | 6/1999 | Bennett | 56/119 |
| 6,143,230 A | * | 11/2000 | Andrios et al. | 264/306 |
| 6,247,297 B1 | * | 6/2001 | Becker | 56/119 |

\* cited by examiner

*Primary Examiner*—Árpád Fábián Kovács
(74) *Attorney, Agent, or Firm*—Cook, Alex, McFarron, Manzo, Cummings & Mehler, Ltd.

(57) ABSTRACT

A tip for the leading end of a crop divider of a combine corn head comprises a tip body of a durable low friction polymer which covers the snoot of the crop divider to reduce the incidents of clogging of the combine head as the head is advanced through the crop.

13 Claims, 2 Drawing Sheets

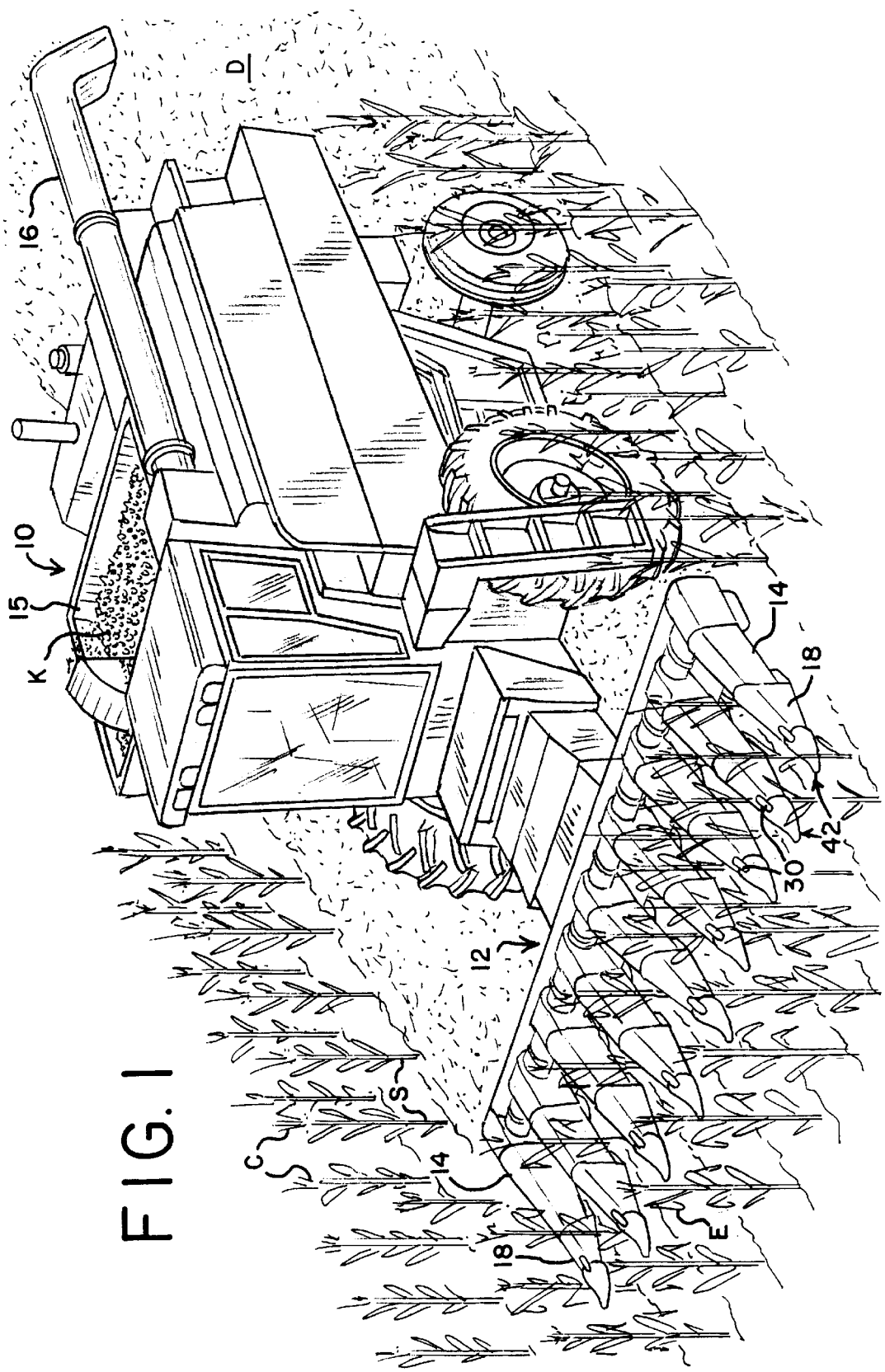

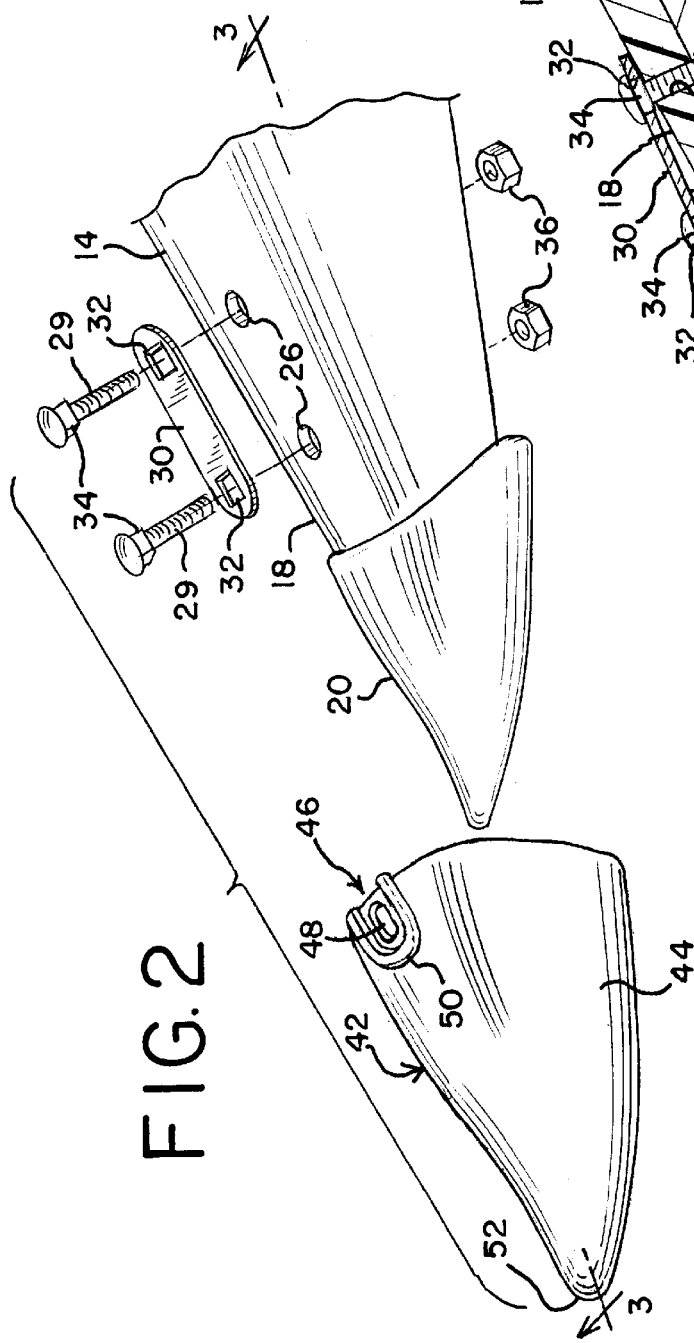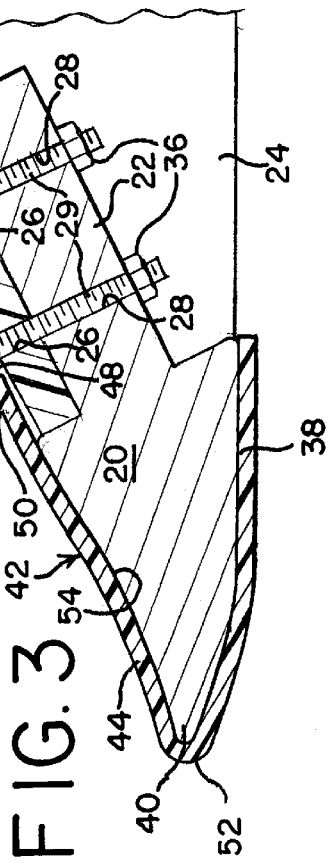

TIP FOR COVERING THE SNOOT OF A CROP DIVIDER

BACKGROUND AND SUMMARY OF THE INVENTION

The present invention is directed to a tip for the leading end of a crop divider of a combine corn head and, more particularly, to a tip which covers the metal snoot of such crop divider.

Combine corn heads typically include a plurality of horizontally spaced crop dividers which extend forward on the head in the direction of advance of the head through the crop. The purpose of the crop dividers is to manipulate the corn stalks as the combine head passes through the crop so as to position them so that other components of the head can sever the stalks adjacent the ground, separate the ears of corn from the stalks, remove the cobs from the husks and the corn kernels from the cobs, and chop up the husks, cobs and the stalk debris, respectively.

The crop dividers are typically formed of a plastic polymer and taper forward toward the leading end of the crop dividers. A durable metal snoot, usually of a relatively heavy cast iron, is fastened to extend from the leading end of each of the crop dividers. This cast iron snoot is capable of withstanding the considerable abrasion and other forces to which the leading end of the crop divider is subjected as it is advanced into the crop. The cast iron snoot also provides a weight which tends to urge the crop divider downwardly by gravity toward the ground and position it in its best position to sever and separate the stalks at ground level.

These cast iron snoots suffer several disadvantages which are probably due to the fact that after some initial use the paint is abraded from the cast-iron metal snoots which leads to rusting of the snoots. One such disadvantage is that the stalks and other debris tend to clog the snoot tipped crop dividers, particularly when the crop is weedy, wet and/or in the case of certain corn varieties which drop leaves to the ground prior to harvest. The rusted snoots are also difficult to see by the operator of the combine. Visibility of the snoots and their location relative to the ground is important because the crop dividers should be operated to run just above the ground for best efficiency. Moreover, the rusty snoots are rather unattractive from an aesthetic standpoint.

The present invention is directed to a tip for the leading end of a crop divider of a combine corn head which overcomes these several aforementioned disadvantages. The tip of the present invention is durable, rigid and of low friction and formed of a material which does not rust. Accordingly, clogging of the crop dividers of the corn head is substantially reduced which reduces or avoids the need to frequently stop or reverse the combine in order to clear the corn head. Moreover, the tips may be more easily viewed by the combine operator because they may be of a color which has a high visibility which permits more accurate positioning of the tips just above the ground during advance of the crop dividers through the crop, and the aesthetic appearance of the crop dividers is improved because rust is not visually perceived by the viewer.

In one principal aspect of the present invention, a tip for the leading end of a crop divider of a combine corn head comprises a body formed of a durable, low friction polymer, and a fastening site on the body for fastening the body adjacent the leading end of the crop divider so that as the crop divider is advanced through the crop, the body is the first to encounter the crop. The body is shaped so as to taper from an end adjacent the fastening site to substantially a point at a leading end forward of the fastening site.

In another principal aspect of the present invention, the polymer is a polyolefin or nylon.

In still another principal aspect of the present invention, the body is of a color which has a high visibility to an operator of the combine corn head when the body is advanced through the crop.

In still another principal aspect of the present invention, the body includes a substantial cavity therein and the cavity opens through the body at the end adjacent the fastening site and is closed by the point at the leading forward end.

In still another principal aspect of the present invention, the cavity is constructed and arranged to receive a snoot of a crop divider of a combine corn head therein so that the body defines a cover for the snoot.

In still another principal aspect of the present invention, the geometric size and shape of the cavity is substantially identical to the geometric size and shape of the snoot.

These and other objects, features and advantages of the present invention will be more clearly understood through a consideration of the following detailed description.

BRIEF DESCRIPTION OF THE DRAWINGS

In the course of this description, reference will be frequently made to the attached drawings in which:

FIG. 1 is a perspective view of a corn combine in operation and being advanced through the crop for harvest, and having a corn head with crop dividers having a preferred embodiment of the tip of the present invention;

FIG. 2 is a broken, exploded, perspective view of the leading end of one of the crop dividers substantially as viewed in FIG. 1; and FIG. 3 is a cross-sectioned, side elevation view of the assembled crop divider and tip, substantially as viewed along line 3—3 of FIG. 2.

DESCRIPTION OF THE PREFERRED EMBODIMENT

A combine 10 is shown in FIG. 1 having a corn head 12 mounted thereon for the harvest of corn C in the field. Such corn heads typically include a plurality of elongate, crop dividers 14 which are horizontally spaced from each other. The crop dividers 14 extend in the direction of advance of the combine head 12 through the crop to facilitate separation and positioning of the corn stalks S for severing them from the ground. Once the stalks are severed, the ears E of corn are separated from the stalks S, the corn kernels are separated from the husks and the kernels K are held in a hopper 15 on the combine. The kernels K may be discharged from the hopper 15 through a chute 16 to a suitable trailer or gravity box (not shown). The stalks S and husks are ground and the ground debris D is left on the field. The mechanisms for the severing of the stalks S and subsequent processing are not shown or described in detail herein because they do not form a part of the present invention.

The elongated crop dividers 14 are typically formed of a polymeric plastic material and they generally taper to a somewhat smaller dimension toward their leading end 18. As previously mentioned, considering the substantial wear and abrasion to which the leading end of the crop dividers will be subjected during advance through the crop, each crop divider 14 is preferably fitted with a tapered metal snoot 20, as best seen in FIGS. 2 and 3.

The snoot 20 may include a reversely extending shaft 22 which is preferably rectangular or square in cross-section, and which extends back up into a channel 24 in the crop divider 14 as best seen in FIG. 3. A pair of holes 26 extend through the upper wall of the crop divider 14 adjacent its leading end 18, and a pair of holes 28 also extend through the shaft 22 of the snoot 20, as best seen in FIG. 3. The holes 26 and 28 receive bolts 29 for fastening the snoot 20 onto the leading end 18 of each crop divider 14, such that the snoot 20 extends forwardly from the leading end of the crop divider in the direction of advance of the combine corn head 12 through the crop. An elongate plate 30 is also preferably provided having square openings 32 therethrough which cooperate with squared portions 34 beneath the bolt heads to prevent the bolts 29 from rotating during tightening. The snoot fastening assembly is completed by lock nuts 36 which are threaded onto the ends of the bolts 29 to fasten the snoot shaft 22 in the channel 24, as best seen in FIG. 3. The lock nuts 36 may consist of nothing more than a typical nut which has a different thread spacing than the threads on the bolts 29 so that when it is installed on the bolts, the nut 36 must be turned with force in order to thread onto the bolt. During such threading, however, rotation of the bolt is prevented by the square openings 32 in the plate 30 and the squared bolt portions 34 at the top of bolts 29.

The snoot 20 is typically of a relatively unsymmetric geometric configuration as seen in the drawings. Its bottom 38 is typically flat over its width and a substantial portion of its length so that if it touches the ground, it will ride freely along the surface of the ground. The snoot 20 typically tapers over its length to a forward snoot point 40 which is smaller in dimensions than the rear of the snoot and which turns upwardly somewhat from the snoot bottom 38. The geometric shape of the snoot generally facilitates its advance through the crop during harvest while minimizing digging of the snoot point 40 into the ground.

Because the snoots 20 bear the blunt of contact of the crop dividers 14 as they advance through the crop at speeds of as much as 8–10 miles per hour, it will be appreciated that the snoots are formed of a material which is capable of withstanding the substantial frictional and abrasive forces which exist. Thus, the snoots 20 are typically formed of cast iron which may be painted for aesthetic reasons.

The combine 10, its corn head 12 and crop dividers 14 with snoots 20 thus far described are conventional in the art. After some initial use, the decorative paint covering on the snoots 20 is typically abraded off, thus exposing the cast iron to moisture and rust. It is believed that such rusting presents the clogging problem as previously described. Moreover, the rusted snoots are relatively ugly in appearance, and because they are of a dark rust color, cannot easily be seen by the combine operator during operation of the combine.

In the present invention, a tip 42 is provided which covers the snoot 20 as seen in FIG. 3. The tip 42 has an overall geometric configuration similar to that of the snoot 20. However, the tip 42 is formed of a preferably molded durable, rigid low friction polymer body 44, such as a suitable polyolefin or nylon. However, it will be appreciated that any one of a number of polymers may be employed so long as they are sufficiently durable and are capable of providing a low friction surface in accordance with the principles of the present invention. The tip 42 is also preferably of a high visibility color, such as a bright yellow, so that its location may be easily seen by the combine operator.

As best seen in FIG. 3 the upper end of the tip body 44 extends beyond the rear of the snoot 20 where it is provided with a fastening site generally 46 for fastening the body 44 to the leading end 18 of the crop divider 14. The fastening site 46 may generally comprise a hole 48 through the top of the body 44 which is partially framed by a framing ridge 50 which forms a recess for receiving the front end of plate 30 as seen in FIG. 3. The framing ridge 50 also strengthens the fastening site 46, as well as streamlines the site and protects the leading end of the plate 30 during advance through the crop.

Like the snoot 20, the body is similarly shaped to taper from the end adjacent the fastening site 46 to substantially a point 52 at its leading end. The tip body 44 is preferably molded so as to define a cavity 54 in the body to permit it to receive the snoot 20 in a covering relationship to the snoot. The geometric size and shape of the cavity 54 is preferably substantially identical to the geometric size and shape of the snoot so that the snoot 20 fits snugly into the cavity 54.

To install and fasten the tip body 44 in a covering relationship to the snoot 20, the tip body 44 is slid over the snoot 20, as seen in FIG. 3, until the leading end of the plate 30 is positioned within the framing ridge 50 with the square opening 32 at the forward end of the plate overlying the hole 48 in the tip body 44. The bolt 29 is then inserted through the square opening 32, the hole 48 and the forward hole 28 through the shaft 22 of the snoot 20, and the nut 36 is threaded onto the bolt to fasten the snoot 20 and tip body 44 to the leading end 18 of each crop divider 14.

It will be understood that the preferred embodiment of the present invention which has been described is merely illustrative of the principles of the present invention. Modifications may be made by those skilled in the art without departing from the true spirit and scope of the invention.

I claim:

1. A tip for covering a snoot at the leading end of a crop divider of a combine head, said tip comprising:
    a body formed of a durable, low friction polymer;
    a fastening site on said body for fastening said body adjacent the leading end of the crop divider so that as the crop divider is advanced through the crop, the body is the first to encounter the crop;
    said body being shaped so as to taper from an end of said body adjacent said fastening site to substantially a point at a leading end of said body forward of said fastening site;
    wherein said body includes a substantial cavity therein which opens through the body at said end adjacent said fastening site and is closed by said point at said leading forward end; and
    wherein said cavity is constructed and arranged to receive the snoot of the crop divider therein so that said body defines a cover for the snoot.

2. The tip of claim 1, wherein said polymer is a polyolefin or nylon.

3. The tip of claim 1, wherein said body is of a color which has a high visibility to an operator of the combine corn head when the body is advanced through the crop.

4. The tip of claim 1, wherein the geometric size and shape of said cavity is substantially identical to the geometric size and shape of the snoot.

5. The tip of claim 1, wherein said combine head is a corn head.

6. A combine head including an
    elongate crop divider for dividing the crop as the crop divider is advanced through the crop; a snoot on and extending forwardly adjacent the leading end of the crop divider, a tip substantially covering said snoot, said tip comprising a body formed of a durable, low friction polymer; a fastener fastening said body adjacent the leading end of the crop divider so that as the crop divider is advanced through the crop, the body is the first to encounter the crop; and said body is shaped so as to taper from an end of said body adjacent said fastener to substantially a point at a leading end of said body forward of said fastener; wherein said body includes a substantial cavity therein which opens through said body at said end adjacent said fastener and is closed by said point at said leading forward end; and wherein said cavity is constructed and arranged to receive said snoot therein so that said body defines a cover for said snoot.

7. The combine head of claim 6, wherein said polymer is a polyolefin or nylon.

8. The combine head of claim 6, wherein said body is of a color which has a high visibility to an operator of the combine corn head when the body is advanced through the crop.

9. The combine head of claim 6, wherein the geometric size and shape of said cavity is substantially identical to the geometric size and shape of said snoot.

10. The combine head of claim 6, wherein said snoot is a durable metal.

11. The combine head of claim 10, wherein said metal is cast iron.

12. The combine head of claim 6, wherein said combine head is a corn head.

13. The combine head of claim 6, wherein said tip removably covers said snoot.

* * * * *